(12) United States Patent
Yoshinari et al.

(10) Patent No.: US 11,165,371 B2
(45) Date of Patent: Nov. 2, 2021

(54) POWER TOOL

(71) Applicant: Koki Holdings Co., Ltd., Tokyo (JP)

(72) Inventors: Takuya Yoshinari, Ibaraki (JP); Hideyuki Tanimoto, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/635,553

(22) PCT Filed: Jun. 29, 2018

(86) PCT No.: PCT/JP2018/024854
§ 371 (c)(1),
(2) Date: Jan. 31, 2020

(87) PCT Pub. No.: WO2019/026503
PCT Pub. Date: Feb. 7, 2019

(65) Prior Publication Data
US 2020/0259429 A1    Aug. 13, 2020

(30) Foreign Application Priority Data

Jul. 31, 2017 (JP) .............................. JP2017-148732
Jul. 31, 2017 (JP) .............................. JP2017-148733

(51) Int. Cl.
*H02P 3/22* (2006.01)
*B24B 47/12* (2006.01)
*B24B 23/02* (2006.01)

(52) U.S. Cl.
CPC ............... *H02P 3/22* (2013.01); *B24B 47/12* (2013.01); *B24B 23/02* (2013.01)

(58) Field of Classification Search
CPC ......................................................... H02P 6/28
(Continued)

(56) References Cited

U.S. PATENT DOCUMENTS 5,432,420 A * 7/1995 Bahn ....................... H02P 3/065
                                                                            318/376
5,449,993 A * 9/1995 Davis ...................... H02M 3/158
                                                                            318/376

(Continued)

FOREIGN PATENT DOCUMENTS

JP   H03190582   8/1991
JP   H11311436   11/1999
(Continued)

OTHER PUBLICATIONS

"International Search Report (Form PCT/ISA/210) of PCT/JP2018/024854," dated Aug. 14, 2018, with English translation thereof, pp. 1-4.

*Primary Examiner* — David Luo
(74) *Attorney, Agent, or Firm* — JCIPRNET

(57) ABSTRACT

Provided is a power tool capable of performing braking in which deterioration and breakage of elements are inhibited. In a brake control, an arithmetic unit 21: performs a switching control of a combination of any of upper arm side Q1-Q3 switching elements and any of lower arm side switching elements Q4-Q6 while sequentially switching the elements; and causes a current to flow in a closed loop (a closed loop in the same direction as during driving of the power tool) in order through any of the upper arm side Q1-Q3 switching elements, stator coils 6e, any of the lower arm side switching elements Q4-Q6, and a first diode bridge 15.

15 Claims, 9 Drawing Sheets

(58) Field of Classification Search
USPC .......................... 318/400.22, 400.21, 400.01
See application file for complete search history.

(56) References Cited

U.S. PATENT DOCUMENTS 7,233,124 B2 * 6/2007 Takeoka .................. H02P 23/06
                                                        318/376
9,246,416 B2 * 1/2016 Ichikawa .................. H02P 3/22

FOREIGN PATENT DOCUMENTS

| | | |
|---|---|---|
| JP | 2008252966 | 10/2008 |
| JP | 2010269426 | 12/2010 |
| JP | 5381390 | 1/2014 |
| JP | 2016158464 | 9/2016 |
| WO | 2016098563 | 6/2016 |

\* cited by examiner

FIG. 11

POWER TOOL

CROSS-REFERENCE TO RELATED APPLICATION

This application is a 371 application of the International PCT application serial no. PCT/JP2018/024854, filed on Jun. 29, 2018, which claims priority under 35 U.S.C. § 119 to Japanese Application No. 2017-148732 and Japanese Application No. 2017-148733 filed Jul. 31, 2017. The entirety of each of the abovementioned patent applications is hereby incorporated by reference herein and made a part of this specification.

BACKGROUND

Technical Field

The present disclosure relates to a power tool such as a grinder in which a brushless motor is used as a drive source.

Description of Related Art

The following patent literature 1 discloses a grinder. In a grinder, it is required to improve workability by applying a brake to a motor to stop a grindstone thereof quickly after work is finished. At this time, when braking is too strong, there is a likelihood that the grindstone will come off, and thus it is necessary to apply an appropriate braking force to the motor. The following patent literature 2 discloses that, in a driver drill using a brushless motor as a drive source, a brake is applied by short-circuiting a lower arm side switching element of an inverter circuit that energizes the brushless motor.

CITATION LIST

Patent Literature

Patent Literature 1
   Japanese Patent Laid-Open No. 2010-269426.
Patent Literature 2
   Japanese Patent No. 5381390.

SUMMARY

Technical Problem

When a brake in which a lower arm side switching element is short circuited as disclosed in the patent literature 2 is applied to a grinder, a braking force is too strong and a grindstone is likely to come off. Here, such a braking force can be weakened by turning on and off the lower arm side switching element by a PWM control, but in this case, there is a risk of elements being broken due to generation of much regenerative energy.

The present disclosure has been made in view of such a situation, and is to provide a power tool capable of performing braking in which deterioration and breakage of elements are inhibited.

Solution to Problem

One aspect of the present disclosure is a power tool. A power tool includes a brushless motor, an inverter circuit which energizes the brushless motor, a control unit which controls the inverter circuit, and a switch which switches between application and cutoff of a voltage input to the inverter circuit, wherein the inverter circuit includes an upper arm side switching element and a lower arm side switching element, the control unit performs a brake control of applying a braking force to the brushless motor when the switch is turned off, and the brake control is a control of causing a current to flow in a closed loop passing through the upper arm side switching element, the brushless motor, and the lower arm side switching element by a switching control of the upper arm side switching element and the lower arm side switching element.

The power tool may include a rectifying circuit which converts alternating electricity into direct electricity and supplies the direct electricity to the inverter circuit, in which the switch may be a two-pole switch provided on an input side of the rectifying circuit and may switch between conducting and cutting off of both of a path between an AC power supply and one input terminal of the rectifying circuit and a path between the AC power supply and the other input terminal of the rectifying circuit.

The control unit may reduce a duty ratio of at least one of the upper arm side switching element and the lower arm side switching element in the brake control when a rotation speed of the brushless motor is reduced to a threshold value or lower.

The control unit may make a lead angle in the brake control larger than a lead angle in a drive control of the brushless motor.

The brake control may cause a current to flow through the inverter circuit in the same direction as a current direction when the brushless motor is driven.

The power tool may include a rectifying circuit which rectifies an AC power supply, and a smoothing capacitor which smooths a current from the rectifying circuit, wherein a current at the time of the brake control may pass through the rectifying circuit.

Further, any combination of the above-described constituent elements, and those obtained by converting the expressions of the present disclosure between methods and systems are also effective as aspects of the present disclosure.

Advantageous Effects of Invention

According to the present disclosure, a power tool capable of performing braking in which deterioration and breakage of elements are inhibited can be provided.

BRIEF DESCRIPTION OF THE DRAWINGS

FIG. 11 illustrates cross-sectional views of the motor, which are explanatory views illustrating a relationship between change in rotor rotational position and a current flowing through the stator coils in the brake control.

DESCRIPTION OF EMBODIMENTS

Figure 1:
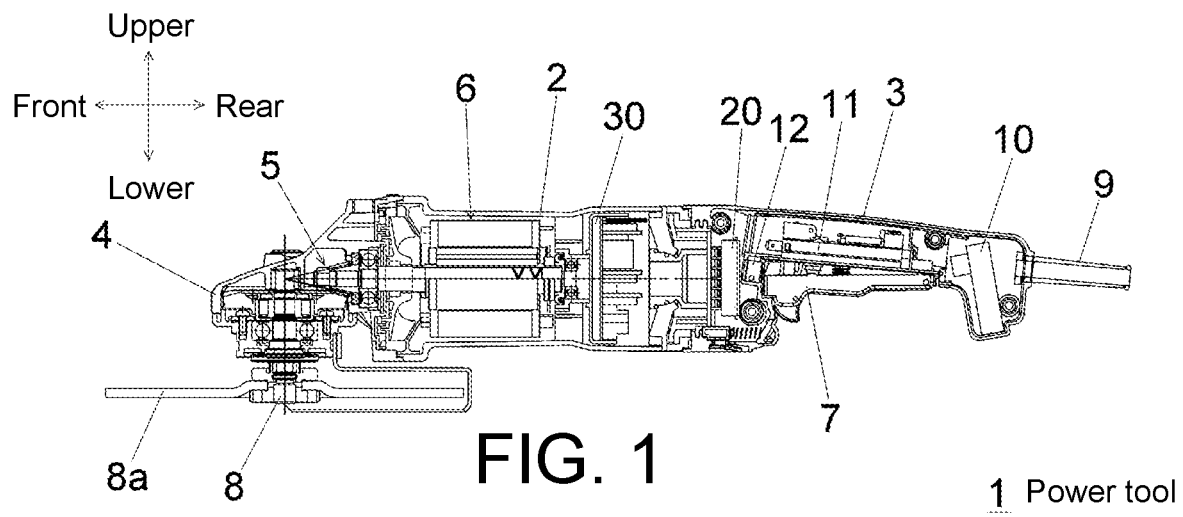
FIG. 1 is a side cross-sectional view of a power tool according to an embodiment of the present disclosure.

Hereinafter, a preferred embodiment of the present disclosure will be described in detail with reference to the drawings. The same or equivalent constituent elements, members, processes, or the like illustrated in the drawings are denoted by the same references, and duplicated descriptions thereof will be omitted as appropriate. Also, the embodiment does not limit the disclosure and is merely an example, and all features and combinations thereof described in the embodiment are not necessarily essential to the disclosure.

Figure 2:
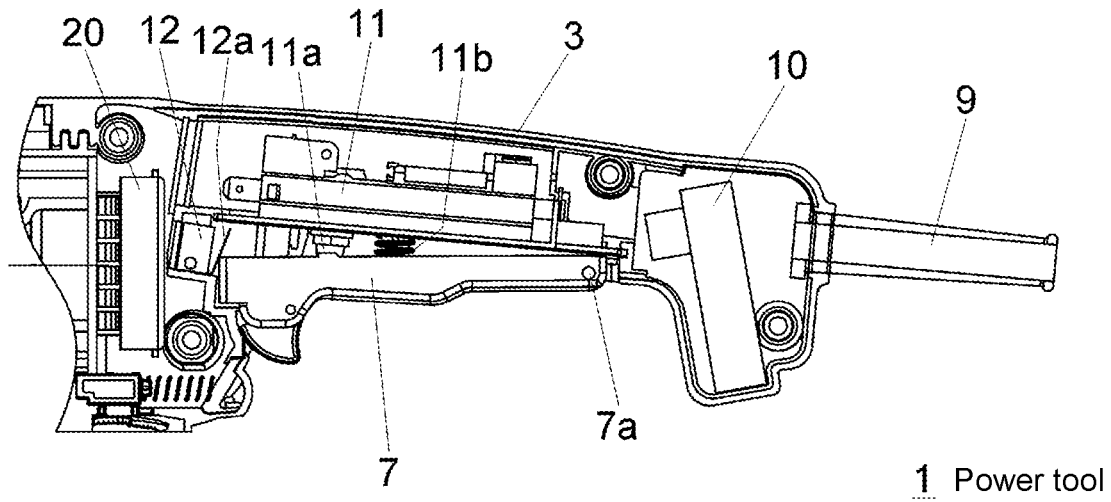
FIG. 2 is an enlarged cross-sectional view of a main part of the power tool in which a trigger is in an OFF state.
Figure 3:
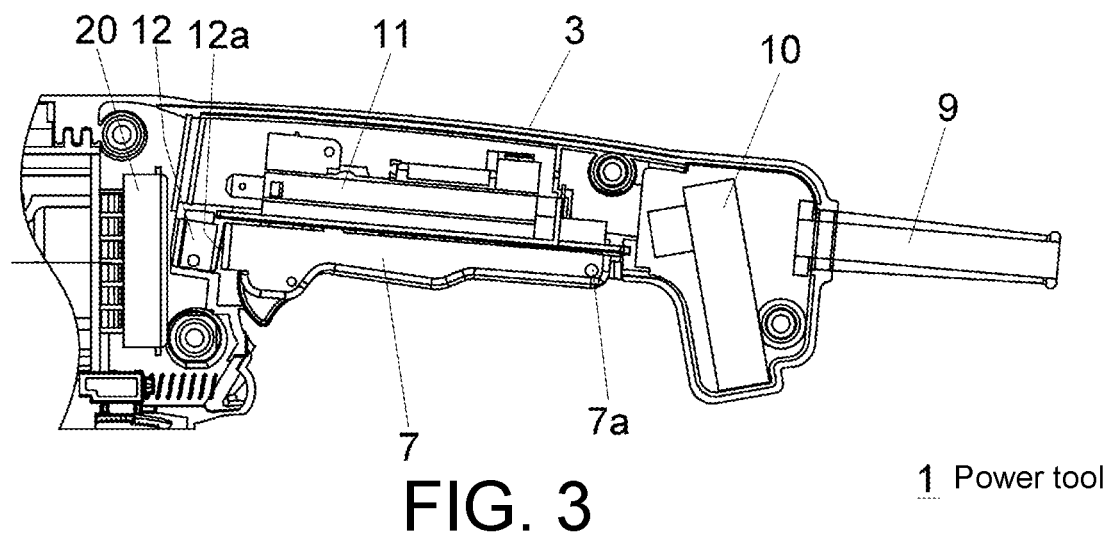
FIG. 3 is an enlarged cross-sectional view of the main part of the power tool in which a trigger is in an ON state.

A mechanical configuration of a power tool 1 of the present embodiment will be described with reference to FIGS. 1 to 3. With reference to FIG. 1, vertical and front-rear directions are defined. The power tool 1 is a grinder. An outer casing of the power tool 1 is formed by a motor housing 2, a handle housing (tail cover) 3, and a gear case 4. The handle housing 3 is attached to a rear end portion of the motor housing 2, and the gear case 4 is attached to a front end portion of the motor housing 2. The motor housing 2 and the handle housing 3 may be, for example, resin-molded bodies. The gear case 4 may be made of a metal such as, for example, aluminum.

Figure 4:
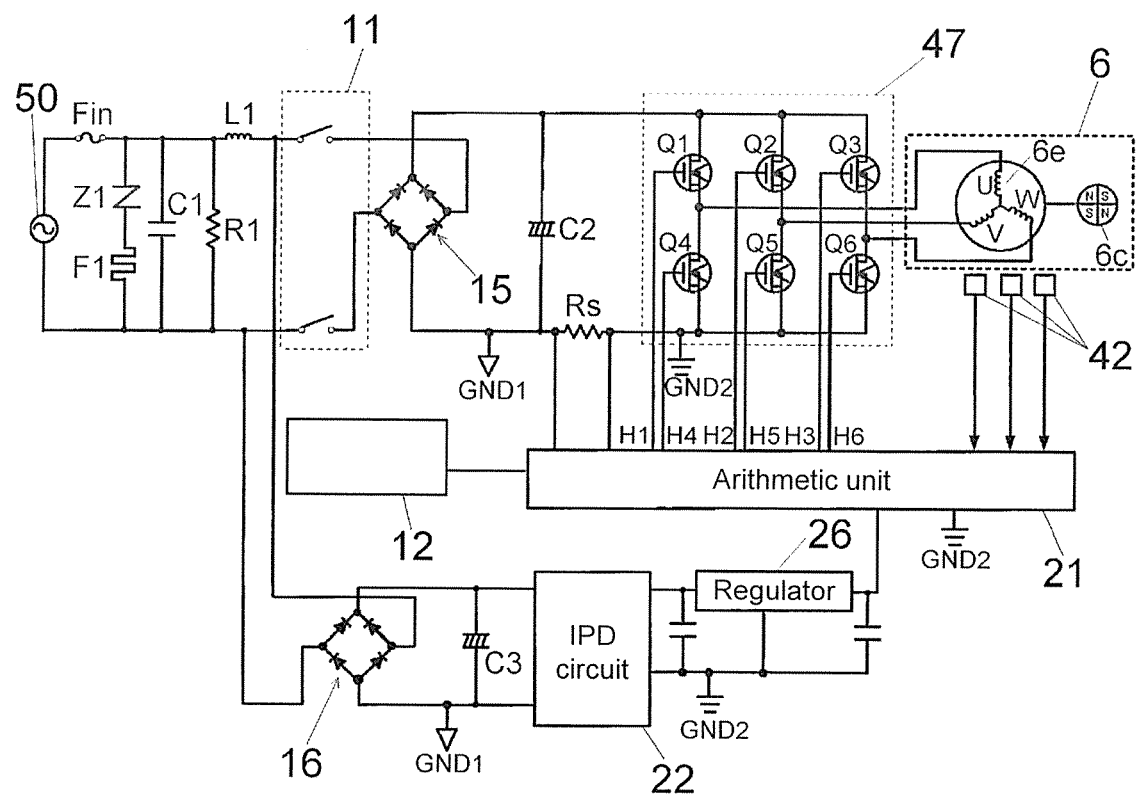
FIG. 4 is a circuit diagram of the power tool.

A power cord 9 extends from a rear end portion of the handle housing 3 and is connected to an external alternating current (AC) power supply 50 (FIG. 4). A filter substrate 10 is provided on a rear portion in the handle housing 3. An auxiliary power supply control substrate 20 is provided on a front portion in the handle housing 3. The handle housing 3 constitutes a handle of the power tool 1. A trigger 7 is swingably (rotatably) supported at a lower portion of the handle housing 3. Here, a swing pivot 7a of the trigger 7 with respect to the handle housing 3 is positioned on a rear end portion of the trigger 7.

The trigger 7 is an operation unit for a user to switch a first switch 11 provided in a current path of a motor 6 ON or OFF. The first switch 11 is preferably a mechanical contact switch, housed in the handle housing 3, and positioned above the trigger 7. As illustrated in FIG. 2, the first switch 11 includes a button 11a facing the trigger 7 side. Also, a spring 11b is provided between the first switch 11 and the trigger 7. When the button 11a is pressed by the trigger 7, the first switch 11 is turned on. The spring 11b applies force to the trigger 7 in a direction in which the first switch 11 is turned off (counterclockwise direction in FIG. 2). When the user grips the trigger 7, the trigger 7 swings upward and the button 11a is pressed to turn on the first switch 11. When the user releases the grip on the trigger 7, the trigger 7 swings downward through the applying force of the spring 11b, a pressed state of the button 11a is released, and the first switch 11 is turned off.

In the handle housing 3, a second switch 12 is provided at a position on a side opposite to the swing pivot 7a of the trigger 7 (side in front of the trigger 7). The second switch 12 is, for example, an electronic switch (a micro switch or the like) that is electrically connected to an arithmetic unit (a control unit) 21 of FIG. 4 and switches between ON/OFF in conjunction with an operation of the trigger 7. The second switch 12 is provided to quickly transmit the operation of the trigger 7 to the arithmetic unit 21 and sends signals of different levels to the arithmetic unit 21 according to its ON/OFF. As illustrated in FIGS. 2 and 3, the second switch 12 includes a leaf spring 12a that faces the trigger 7 side and extends obliquely rearward and upward. As the trigger 7 swings, the leaf spring 12a engages with an end portion (front end portion) on the side opposite to the swing pivot 7a of the trigger 7, and thereby the second switch 12 is switched between being ON/OFF. Specifically, as illustrated in FIG. 3, when the leaf spring 12a is pushed forward (swung forward) by the end portion on the side opposite to the swing pivot 7a of the trigger 7, the second switch 12 is turned on. When the user grips the trigger 7, the trigger 7 swings upward, the leaf spring 12a is pushed, and the second switch 12 is turned on. When the user releases the grip on the trigger 7, the trigger 7 swings downward through the applying force of the spring 11b, the leaf spring 12a returns to an original state (swings backward) due to its own elasticity, and thereby the second switch 12 is turned off.

The motor housing 2 houses the motor 6 and houses a bridge inverter substrate (a drive substrate) 30 in a rear portion of the motor 6. The motor 6 is an inner rotor type brushless motor. A speed reduction mechanism 5 as a rotation transmission mechanism is housed in the gear case 4. The speed reduction mechanism 5 is a combination of a pair of bevel gears and is configured to decelerate rotation of the motor 6 and convert the rotation by 90 degrees to transmit it to a spindle 8. A grindstone 8a as a rotating tool (a tip tool) is provided at a lower end portion of the spindle 8 to be integrally rotatable. Since a mechanical configuration and operation from rotation of the motor 6 to rotation of the grindstone 8a are well known, more detailed description thereof will be omitted.

A circuit configuration of the power tool 1 will be described with reference to FIG. 4. In FIG. 4, the AC power supply 50 is an external AC power supply such as a commercial power supply. A filter circuit provided on the filter substrate 10 is connected to the AC power supply 50. The filter circuit includes a fuse Fin, a varistor Z1, a pattern fuse F1, a capacitor C1, a resistor R1, and a choke coil L1 which are mounted on the filter substrate 10. The fuse Fin is for protection when switching elements Q1 to Q6 are short-circuited. The varistor Z1 is for absorbing a surge voltage. The pattern fuse F1 has a role of preventing a short circuit between lines when the varistor Z1 is activated. The capacitor C1 and the choke coil L1 are for removing noise between lines. The resistor R1 is a discharge resistor of the capacitor C1.

The first switch 11 is provided between an output side of the above-described filter circuit and an input side of a first diode bridge 15. The first switch 11 is a two-pole switch and switches between conducting and cutting off of both of a path between one output terminal of the filter circuit and one input terminal of the first diode bridge 15, and a path between the other output terminal of the filter circuit and the other input terminal of the first diode bridge 15, according to an ON state or OFF state. That is, when the first switch 11 is in an OFF state, all current paths from the AC power supply 50 to the first diode bridge 15 are cut off. When the first switch 11 is in the OFF state, a closed circuit (closed loop) including the first diode bridge 15, an electrolytic capacitor C2, and an inverter circuit 47 is formed. The first diode bridge 15 serving as a first rectifying circuit performs full-wave rectification on an output voltage of the above-described filter circuit that has been input via the first switch 11 to convert it into direct electricity, and supplies the direct electricity to the inverter circuit 47. The electrolytic capacitor C2 is for absorbing surges and is provided between output terminals of the first diode bridge 15. The electrolytic capacitor C2 is a smoothing capacitor that smooths a current from the first diode bridge 15. Further, since priority is given to miniaturization of a main body in the power tool 1, it is difficult to mount an electrolytic capacitor having a capacity that completely smooths a current, and thus the electrolytic capacitor C2 cannot completely smooth the current from the first diode bridge 15. In other words, in order to give priority to miniaturization of the power tool 1, a capacity of the electrolytic capacitor C2 is a capacity to such an extent as to allow a non-energized state (a state in which a voltage applied to the motor 6 is lower than an induced voltage) during work. A resistor Rs is a detection resistor for detecting a current flowing through the motor 6 and is provided in the current path of the motor 6. The power tool 1 includes a first ground GND1 and a second ground GND2, and the first ground GND1 and the second ground GND2 are connected to each other via the resistor Rs. The first diode bridge 15, the electrolytic capacitor C2, the inverter circuit 47, and the resistor Rs are provided on the bridge inverter substrate 30 of FIG. 1.

The inverter circuit 47 includes the switching elements Q1 to Q6 such as insulated gate bipolar transistors (IGBTs) or field effective transistors (FETs) connected in a three-phase bridge and performs a switching operation in accordance with a control of the arithmetic unit 21 as a control unit to supply a drive current to stator coils 6e (each winding of U-phase, V-phase, and W-phase) of the motor 6. The switching elements Q1 to Q3 are upper arm side switching elements, and the switching elements Q4 to Q6 are lower arm side switching elements. In the switching elements Q1 to Q3, the motor 6 side is a source, and the power supply side (a positive terminal side of the first diode bridge 15) is a drain. In the switching elements Q4 to Q6, the motor 6 side is a drain, and the ground side (a negative terminal side of the first diode bridge 15) is a source. Between the drains and sources of the switching elements Q1 to Q6, a diode (not illustrated) (either a parasitic diode or a separate diode, or both) whose source side is an anode is provided.

The arithmetic unit 21 detects a current of the motor 6 using a voltage between both ends of the resistor Rs. Also, the arithmetic unit 21 detects a rotational position of the motor 6 (a rotor rotational position) using output voltages of a plurality of Hall elements (magnetic sensors) 42. The arithmetic unit 21 controls driving and braking of the motor 6 according to a state (ON/OFF) of the second switch 12 that is linked to the operation of the trigger 7. Specifically, when the second switch 12 is turned on by the operation of the trigger 7, the arithmetic unit 21 performs a switching control (for example, a pulse width modulation (PWM) control) on the switching elements Q1 to Q6 and controls driving of the motor 6. When the second switch 12 is turned off by the operation of the trigger 7, the arithmetic unit 21 performs a control (a brake control) for applying a braking force to the motor 6. Details of the brake control will be described below.

A second diode bridge 16 as a second rectifying circuit performs full-wave rectification on an output voltage of the above-described filter circuit that has been input without passing through the first switch 11 to convert the output voltage into direct electricity. An electrolytic capacitor C3 is for absorbing surges and is provided between output terminals of the second diode bridge 16. An IPD circuit 22 is provided on an output side of the second diode bridge 16. The IPD circuit 22 is a circuit configured by an IPD element which is an intelligent power device, a capacitor, and the like, and is a DC-DC switching power supply circuit that steps down a voltage rectified and smoothed by the second diode bridge 16 and the surge absorbing electrolytic capacitor C3 to, for example, about 18 V. The IPD circuit 22 is an integrated circuit and has an advantage of low power consumption and energy saving. An output voltage of the IPD circuit 22 is further stepped down to, for example, about 5 V by a regulator 26 and is supplied to the arithmetic unit 21 as an operating voltage (power supply voltage Vcc). The second diode bridge 16, the electrolytic capacitor C3, the arithmetic unit 21, the IPD circuit 22, the regulator 26, and the like are provided on an auxiliary power supply control substrate 20.

Figure 5:
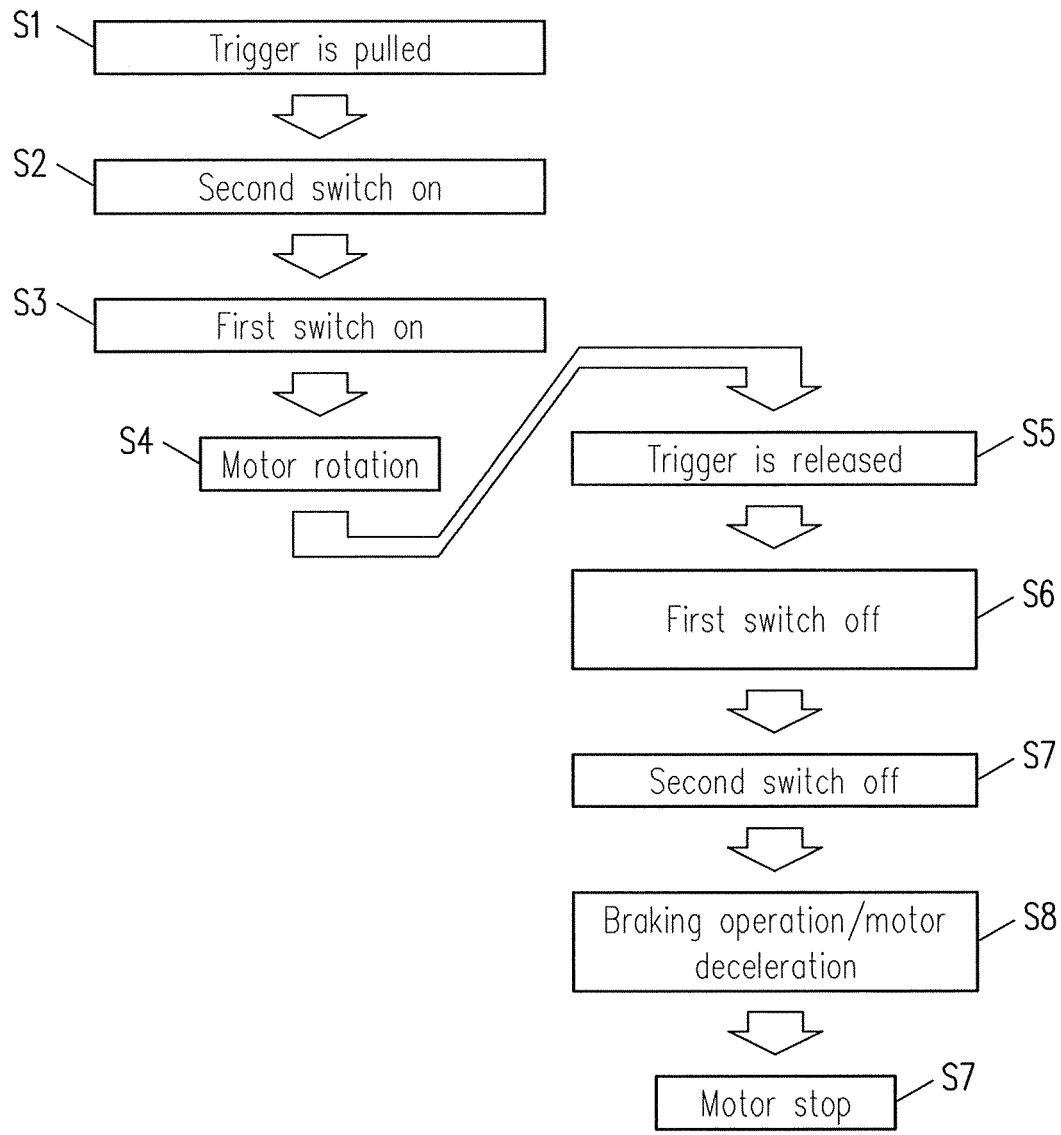
FIG. 5 is a flowchart showing a flow of an operation from starting to stopping of the power tool.

With reference to FIG. 5, a flow of an operation from starting to stopping of the power tool 1 will be briefly described. When the user pulls the trigger 7 (Step S1), the second switch 12 is turned on (Step S2), and then the first switch 11 is turned on (Step S3). Turning-on of the first switch 11 and the second switch 12 through upward swinging of the trigger 7 occurs substantially at the same time. The arithmetic unit 21 starts a switching control of the switching elements Q1 to Q6 through the turned-on second switch 12 (through a signal from the second switch 12 reaching a high level), and rotationally drives the motor 6 (Step S4). Thereafter, when the user releases his/her hand from the trigger 7 (releases a grip on the trigger 7) (Step S5), the first switch 11 is turned off (Step S6), and then the second switch 12 is turned off (Step S7). The turning-off of the first switch 11 and the second switch 12 through downward swinging of the trigger 7 occurs substantially at the same time. The arithmetic unit 21 starts the brake control described above to decelerate rotation of the motor 6 through the turned-off second switch 12 (through a signal from the second switch 12 reaching a low level) (Step S8). As a result, the motor 6 stops (Step S9).

Figure 6:
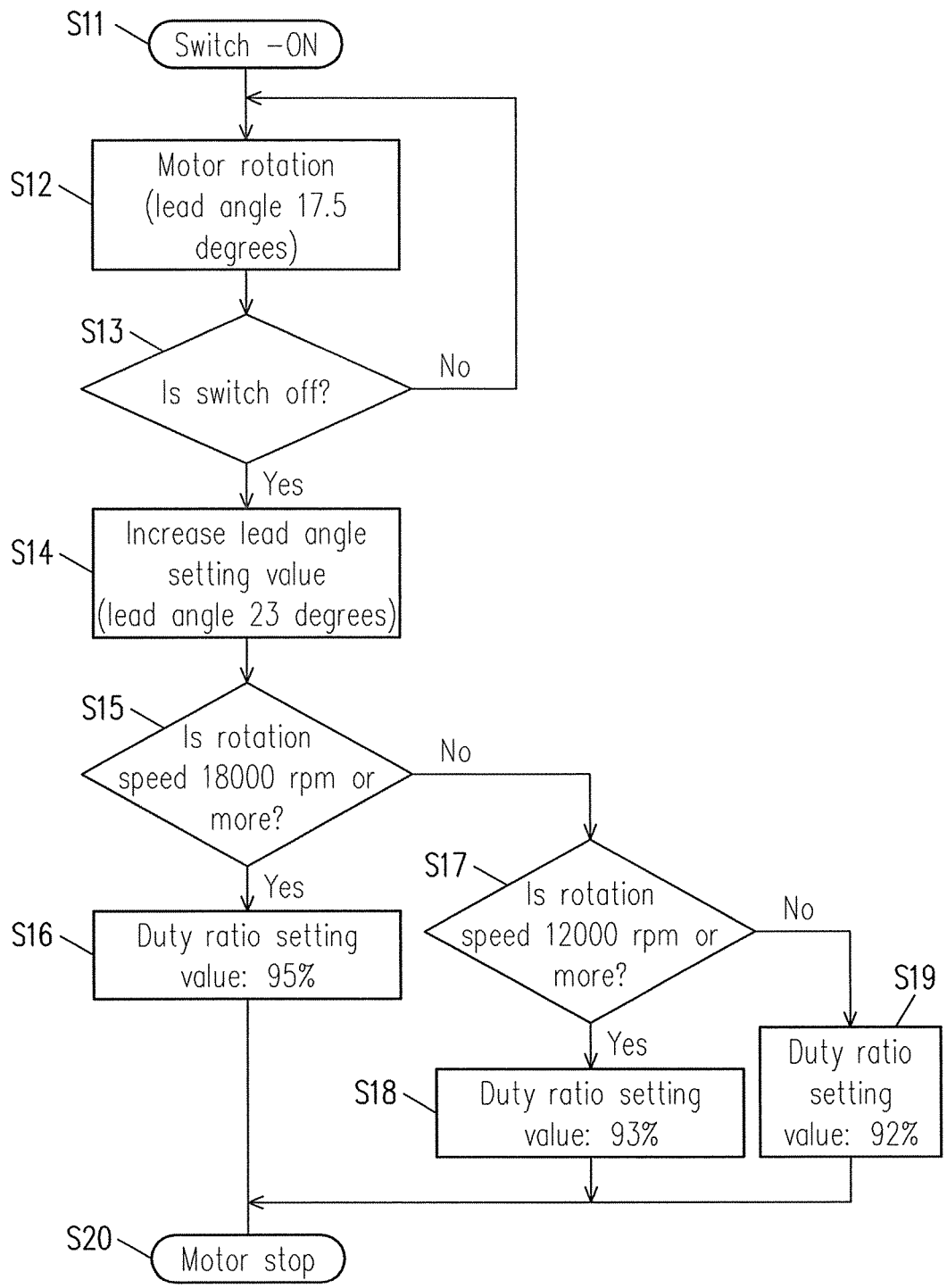
FIG. 6 is a control flowchart of the power tool.

FIG. 6 is a control flowchart of the power tool 1. This flowchart starts when the first switch 11 and the second switch 12 are turned on (Step S11). The arithmetic unit 21 drives the motor 6 to rotate by a switching control of the switching elements Q1 to Q6 of the inverter circuit 47 at a mechanical lead angle of 17.5 degrees (Step S12). When the first switch 11 and the second switch 12 are ON, the arithmetic unit 21 continues driving of the motor 6 (NO in Step S13, and Step S12). When the first switch 11 and the second switch 12 are turned off (YES in Step S13), the arithmetic unit 21 performs the brake control of applying a braking force to the motor 6. Specifically, in a state in which the mechanical lead angle is set to 23 degrees (Step S14), the arithmetic unit 21 applies a braking force to the motor 6 to stop the motor 6 (Step S20) by a switching control of the switching elements Q1 to Q6 with a duty ratio of 95% when a rotation speed of the motor 6 is 18,000 rpm or more (YES in Step S15, and Step S16), by a switching control of the switching elements Q1 to Q6 with a duty ratio of 93% when a rotation speed of the motor 6 is 12,000 to 18,000 rpm (NO in Step S15, YES in Step S17, and Step S18), and by a switching control of the switching elements Q1 to Q6 with a duty ratio of 92% when a rotation speed of the motor 6 is less than 12,000 rpm (NO in Step S15, NO in Step S17, and Step S19).

Figure 7:
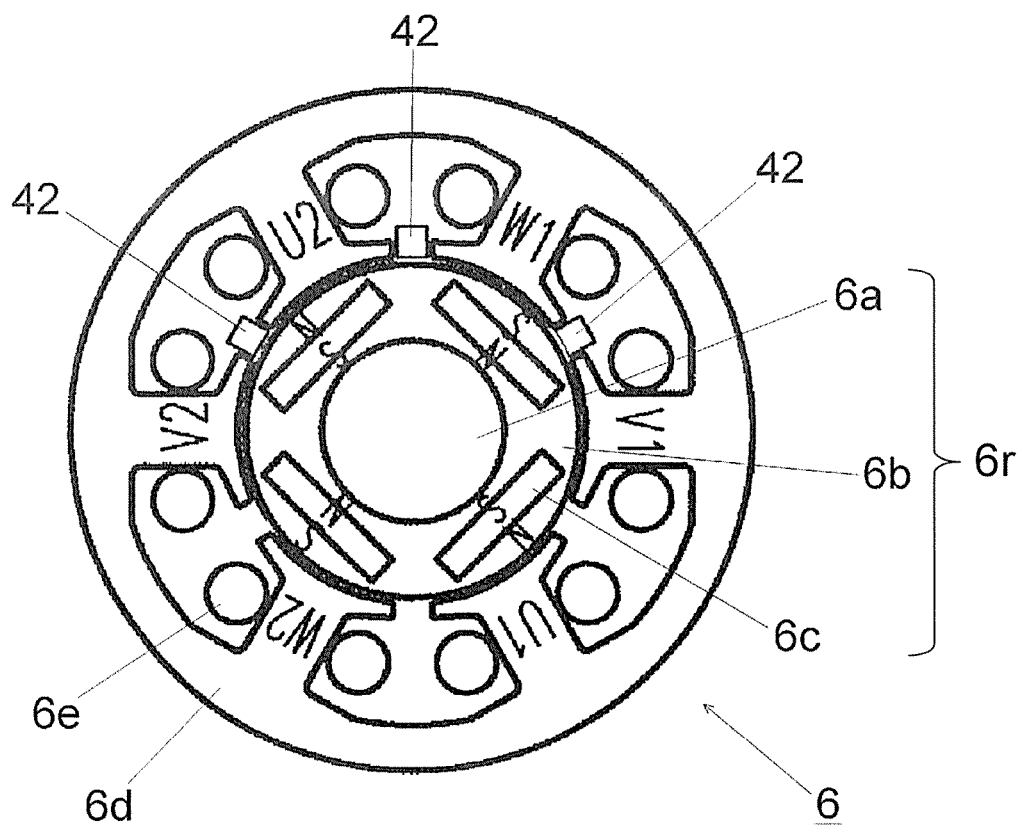
FIG. 7 is a cross-sectional view of a motor of the power tool.

FIG. 7 is a cross-sectional view of the motor 6 of the power tool 1. The motor 6 includes a rotor core 6b provided around an output shaft 6a and rotating integrally with the output shaft 6a, a rotor magnet 6c inserted and held in the rotor core 6b, a stator core 6d provided to surround an outer circumference of the rotor core 6b, and a stator coil 6e provided in the stator core 6d. Four rotor magnets 6c are provided at regular intervals (intervals of 90 degrees) in a direction around an axis. The output shaft 6a, the rotor cores 6c, and the rotor magnets 6c are configured as a rotor 6r. The stator core 6d includes six tooth parts which are winding axes of the stator coils 6e at regular intervals (intervals of 60 degrees) in a direction around the axis. In FIG. 7, the respective tooth parts are denoted by U1, U2, V1, V2, W1, and W2. The stator coils 6e of U-phase (hereinafter also referred to as "U-phase stator coils") are wound around the tooth parts U1 and U2, the stator coils 6e of V-phase (hereinafter referred to as "V-phase stator coils") are wound around the tooth parts V1 and V2, and the stator coils 6e of W-phase (hereinafter also referred to as "W-phase stator coil") are wound around the tooth parts W1 and W2.

The Hall elements 42 are disposed between the tooth parts V1 and W1, between the tooth parts W1 and U2, and between the tooth parts U2 and V2, respectively. The Hall elements 42 are disposed close to an outer circumferential surface of the rotor core 6b, and three Hall elements 42 are provided at intervals of 60 degrees in a direction around the axis of the motor 6. The rotor rotational position in FIG. 7 is a rotational position at which a position of the middle Hall element 42 in a direction around the axis and a position of a center between adjacent rotor magnets 6c in a direction around the axis coincide with each other, and the rotor rotational position in FIG. 7 is a reference position for a mechanical lead angle, and corresponds to a rotor rotation angle of 0 degrees in FIGS. 8 to 13. When a counterclockwise direction in FIG. 7 is set as a rotor rotation direction (normal rotation direction), the mechanical lead angle is a difference in rotor rotation angle between the reference position illustrated in FIG. 7 and a rotor rotational position at which energization to the U-phase stator coil is started. When energization to the U-phase stator coil is started at the reference position illustrated in FIG. 7, the mechanical lead angle is 0 degrees.

Figure 8:
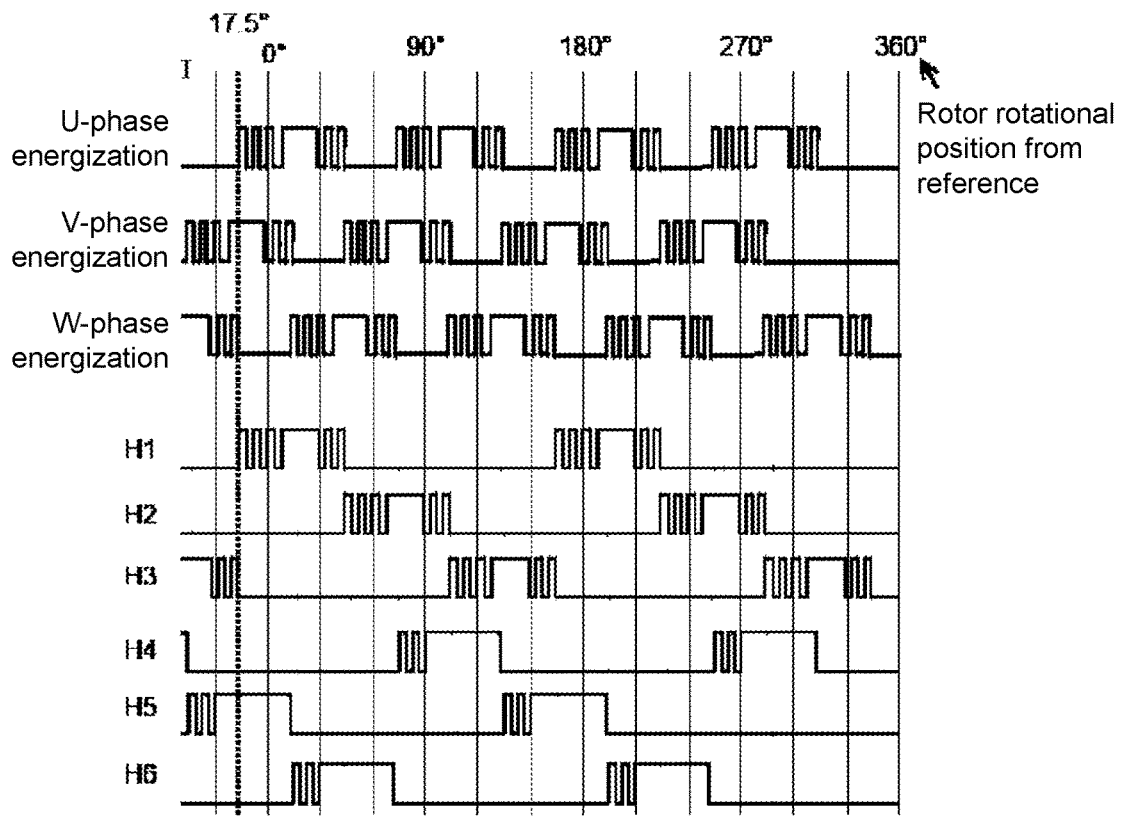
FIG. 8 is a time chart in a drive control of the motor showing energized states of stator coils of a U-phase, V-phase, and W-phase, and drive signals applied to gates of switching elements of an inverter circuit.

FIG. 8 is a time chart in a drive control of the motor 6 showing energized states of the stator coils 6e of a U-phase, V-phase, and W-phase, and drive signals H1 to H6 applied to gates of the switching elements Q1 to Q6 of the inverter circuit 47. The arithmetic unit 21 sets the mechanical lead angle to 17.5 degrees in the drive control of the motor 6. Therefore, energization to the U-phase stator coil is started from 17.5 degrees at which the rotor rotation angle becomes 0 degrees.

Specifically, the arithmetic unit 21 changes the drive signal H1 from a low level to a high level at a rotor rotation angle of −17.5 degrees (the switching element Q1 is turned on). At this time, since the arithmetic unit 21 maintains the drive signal H5 at a high level (switching element Q5 is ON), a current begins to flow through a path of the switching element Q1, the U-phase stator coil, the V-phase stator coil, and the switching element Q5. Further, the drive signals H2 to H4 and H6 are at a low level (switching elements Q2 to Q4 and Q6 are OFF). Hereinafter, description of drive signals maintained at a low level and switching elements maintained in an OFF state in each section will be omitted.

In a section of 30 degrees from the rotor rotation angle of −17.5 degrees to 12.5 degrees, the arithmetic unit 21 sets the drive signals H1 and H5 to a high level (switching elements Q1 and Q5 are ON). Here, the drive signal H1 is a PWM signal, and the switching element Q1 is switched ON and OFF at a predetermined duty ratio (PWM controlled). Thereby, a current flows through the path including the switching element Q1, the U-phase stator coil, the V-phase stator coil, and the switching element Q5.

In a section of 30 degrees from the rotor rotation angle of 12.5 degrees to 42.5 degrees, the arithmetic unit 21 sets the drive signals H1 and H6 to a high level (switching elements Q1 and Q6 are ON). Here, in a first half of the section, the drive signal H6 is a PWM signal, and the switching element Q6 is switched ON and OFF at a predetermined duty ratio (PWM controlled). Also, in a second half of the section, the drive signal H1 is a PWM signal, and the switching element Q1 is switched ON and OFF at a predetermined duty ratio (PWM controlled). Thereby, a current flows through a path including the switching element Q1, the U-phase stator coil, the W-phase stator coil, and the switching element Q6.

In a section of 30 degrees from the rotor rotation angle of 42.5 degrees to 72.5 degrees, the arithmetic unit 21 sets the drive signals H2 and H6 to a high level (switching elements Q2 and Q6 are ON). Here, the drive signal H2 is a PWM signal, and the switching element Q2 is switched ON and OFF at a predetermined duty ratio (PWM controlled). Thereby, a current flows through a path including the switching element Q2, the V-phase stator coil, the W-phase stator coil, and the switching element Q6.

In a section of 30 degrees from the rotor rotation angle of 72.5 degrees to 102.5 degrees, the arithmetic unit 21 sets the drive signals H2 and H4 to a high level (switching elements Q2 and Q4 are ON). Here, in a first half of the section, the drive signal H4 is a PWM signal, and the switching element Q4 is switched ON and OFF at a predetermined duty ratio (PWM controlled). Also, in a second half of the section, the drive signal H2 is a PWM signal, and the switching element Q2 is switched ON and OFF at a predetermined duty ratio (PWM controlled). Thereby, a current flows through a path including the switching element Q2, the V-phase stator coil, the U-phase stator coil, and the switching element Q4.

In a section of 30 degrees from the rotor rotation angle of 102.5 degrees to 132.5 degrees, the arithmetic unit 21 sets the drive signals H3 and H4 to a high level (switching elements Q3 and Q4 are ON). Here, the drive signal H3 is a PWM signal, and the switching element Q3 is switched ON and OFF at a predetermined duty ratio (PWM controlled). Thereby, a current flows through a path including the switching element Q3, the W-phase stator coil, the U-phase stator coil, and the switching element Q4.

In a section of 30 degrees from the rotor rotation angle of 132.5 degrees to 162.5 degrees, the arithmetic unit 21 sets the drive signals H3 and H5 to a high level (switching elements Q3 and Q5 are ON). Here, in a first half of the section, the drive signal H5 is a PWM signal, and the switching element Q5 is switched ON and OFF at a predetermined duty ratio (PWM controlled). Also, in a second half of the section, the drive signal H3 is a PWM signal, and the switching element Q3 is switched ON and OFF at a predetermined duty ratio (PWM controlled). Thereby, a current flows through a path including the switching element Q3, the W-phase stator coil, the V-phase stator coil, and the switching element Q5.

The control in a section of 180 degrees from the rotor rotation angle of 162.5 degrees to 342.5 degrees (−17.5 degrees) is the same as the control in the section of 180 degrees from the rotor rotation angle of −17.5 degrees to 162.5 degrees described above.

Figure 9:
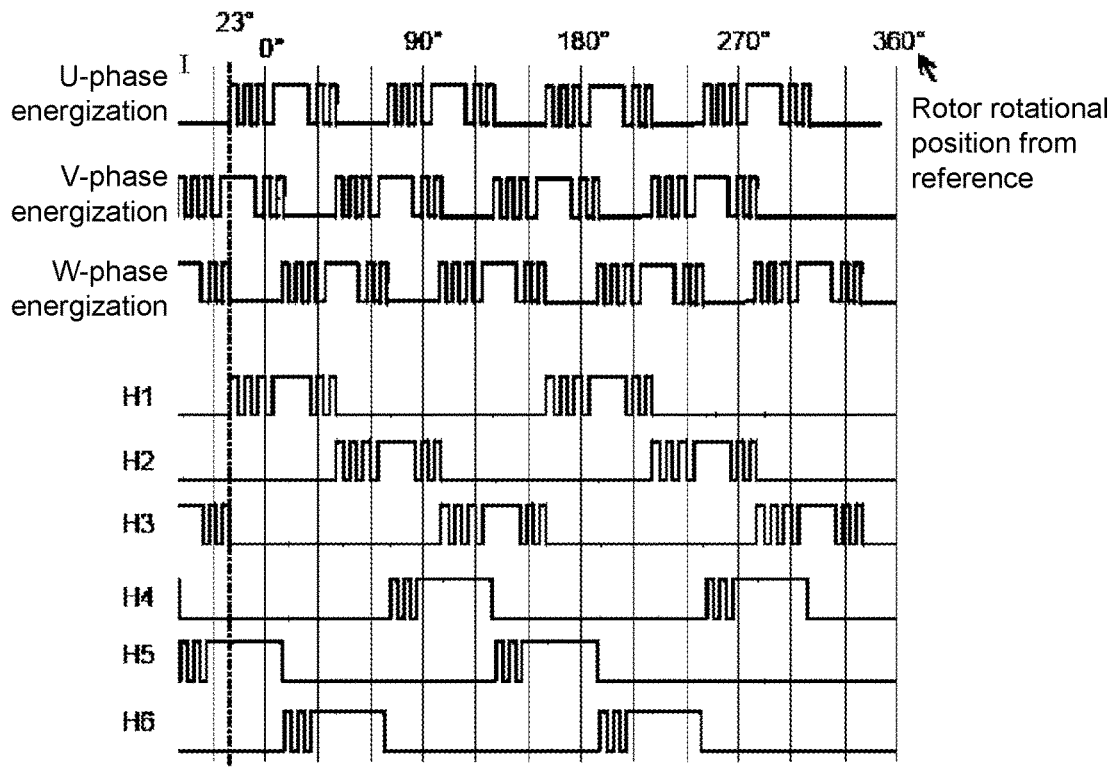
FIG. 9 is a time chart in a brake control of the motor showing currents flowing through the stator coils of a U-phase, V-phase, and W-phase and energized states thereof, and drive signals applied to the gates of the switching elements of the inverter circuit.

FIG. 9 is a time chart in brake control of the motor 6 showing energized states of the stator coils 6e of a U-phase, V-phase, and W-phase, and drive signals H1 to H6 applied to gates of the switching elements Q1 to Q6 of the inverter circuit 47. The arithmetic unit 21 sets the mechanical lead angle to 23 degrees in the brake control of the motor 6. Therefore, energization to the U-phase stator coil is started from 23 degrees at which the rotor rotation angle becomes 0 degrees. Further, in the present embodiment, a state in which the rotor rotation angle is 0 degrees at the time of the brake control is a state in which the rotor rotation angle is rotated by 90 degrees from a state in which the rotor rotation angle is 0 degrees when the motor 6 is driven. That is, the state in which the rotor rotation angle is 0 degrees at the time of the brake control is a position rotated by 90 degrees from the rotational position of the rotor 6r in FIG. 7. Therefore, a state in which the mechanical lead angle is 23 degrees in the brake control is a state in which the rotor 6r is rotated by 67 degrees from the reference position in FIG. 7.

The brake control from the mechanical lead angle 23 degrees in the brake control will be specifically described. The arithmetic unit 21 changes the drive signal H1 from a low level to a high level at a rotor rotation angle of 67 degrees (the switching element Q1 is turned on). At this time, since the arithmetic unit 21 maintains the drive signal H5 at a high level (switching element Q5 is ON), a current begins to flow through a path of the switching element Q1, the V-phase stator coil, the U-phase stator coil, and the switching element Q5.

In a section of 30 degrees from the rotor rotation angle of 67 degrees to 97 degrees, the arithmetic unit 21 sets the drive signals H1 and H5 to a high level (switching elements Q1 and Q5 are ON). Here, the drive signal H1 is a PWM signal, and the switching element Q1 is switched ON and OFF at a predetermined duty ratio (PWM controlled). Thereby, a current flows through a path including the switching element Q1, the V-phase stator coil, the U-phase stator coil, and the switching element Q5.

In a section of 30 degrees from the rotor rotation angle of 97 degrees to 127 degrees, the arithmetic unit 21 sets the drive signals H1 and H6 to a high level (switching elements Q1 and Q6 are ON). Here, in a first half of the section, the drive signal H6 is a PWM signal, and the switching element Q6 is switched ON and OFF at a predetermined duty ratio (PWM controlled). Also, in a second half of the section, the drive signal H1 is a PWM signal, and the switching element Q1 is switched ON and OFF at a predetermined duty ratio (PWM controlled). Thereby, a current flows through a path including the switching element Ql, the W-phase stator coil, the U-phase stator coil, and the switching element Q6.

In a section of 30 degrees from the rotor rotation angle of 127 degrees to 157 degrees, the arithmetic unit 21 sets the drive signals H2 and H6 to a high level (switching elements Q2 and Q6 are ON). Here, the drive signal H2 is a PWM signal, and the switching element Q2 is switched ON and OFF at a predetermined duty ratio (PWM controlled). Thereby, a current flows through a path including the switching element Q2, the W-phase stator coil, the V-phase stator coil, and the switching element Q6.

In a section of 30 degrees from the rotor rotation angle of 157 degrees to 187 degrees, the arithmetic unit 21 sets the drive signals H2 and H4 to a high level (switching elements Q2 and Q4 are ON). Here, in a first half of the section, the drive signal H4 is a PWM signal, and the switching element Q4 is switched ON and OFF at a predetermined duty ratio (PWM controlled). Also, in a second half of the section, the drive signal H2 is a PWM signal, and the switching element Q2 is switched ON and OFF at a predetermined duty ratio (PWM controlled). Thereby, a current flows through a path including the switching element Q2, the U-phase stator coil, the V-phase stator coil, and the switching element Q4.

In a section of 30 degrees from the rotor rotation angle of 187 degrees to 217 degrees, the arithmetic unit 21 sets the drive signals H3 and H4 to a high level (switching elements Q3 and Q4 are ON). Here, the drive signal H3 is a PWM signal, and the switching element Q3 is switched ON and OFF at a predetermined duty ratio (PWM controlled). Thereby, a current flows through a path including the switching element Q3, the U-phase stator coil, the W-phase stator coil, and the switching element Q4.

In a section of 30 degrees from the rotor rotation angle of 217 degrees to 247 degrees, the arithmetic unit 21 sets the drive signals H3 and H5 to a high level (switching elements Q3 and Q5 are ON). Here, in a first half of the section, the drive signal H5 is a PWM signal, and the switching element Q5 is switched ON and OFF at a predetermined duty ratio (PWM controlled). Also, in a second half of the section, the drive signal H3 is a PWM signal, and the switching element Q3 is switched ON and OFF at a predetermined duty ratio (PWM controlled). Thereby, a current flows through a path including the switching element Q3, the V-phase stator coil, the W-phase stator coil, and the switching element Q5.

The control in a section of 180 degrees from the rotor rotation angle of 247 degrees to 67 degrees (mechanical lead angle −23 degrees at the time of the brake control) is the same as the control in the section of 180 degrees from the rotor rotation angle of 67 degrees to 247 degrees described above.

Figure 10:
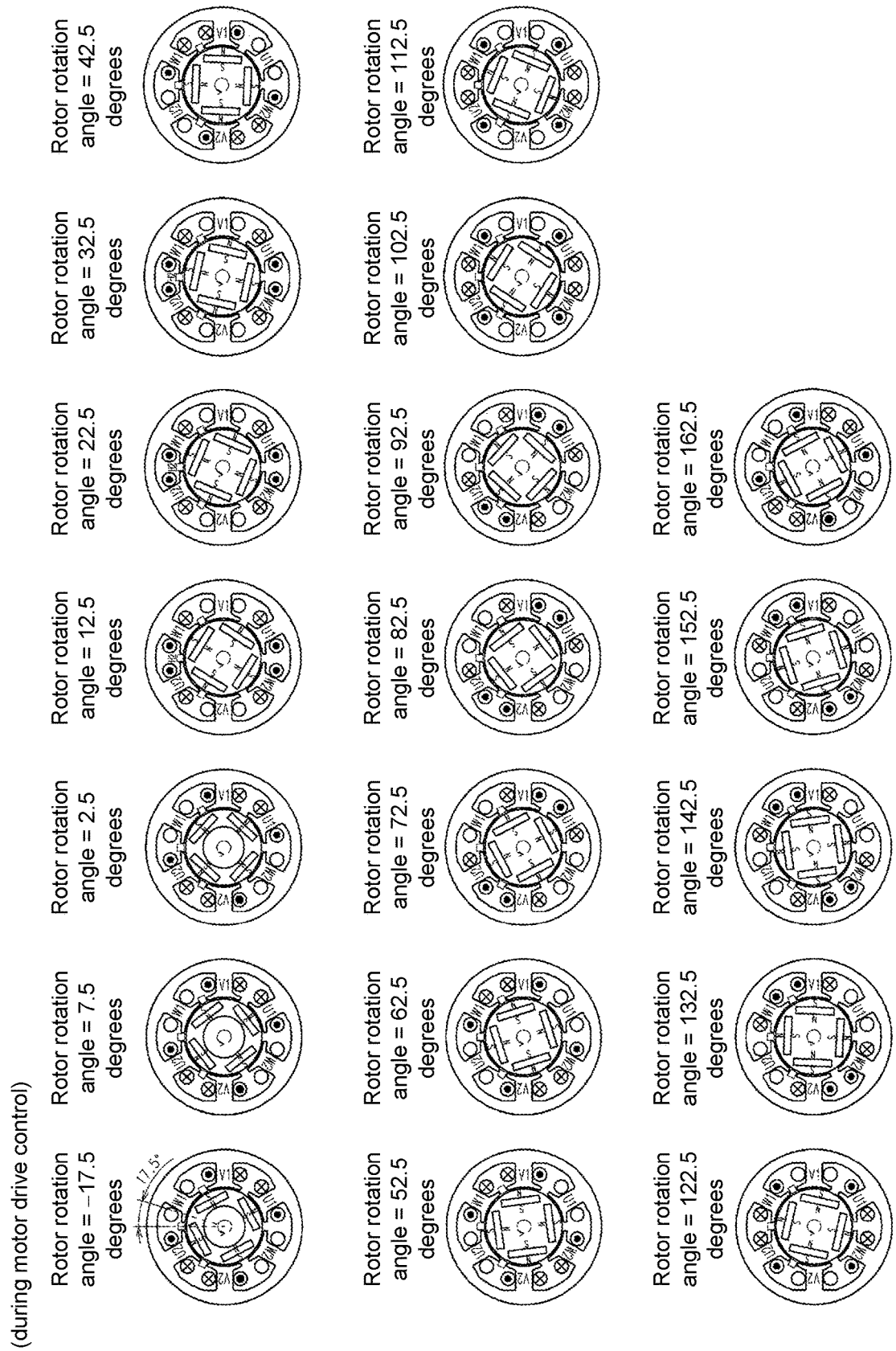
FIG. 10 illustrates cross-sectional views of the motor, which are explanatory views illustrating a relationship between change in rotor rotational position and a current flowing through the stator coils in the drive control.

FIG. 10 illustrates cross-sectional views of the motor 6, which are explanatory views illustrating a relationship between change in rotor rotational position and a current flowing through the stator coils 6e in the drive control. The rotor rotation angle of −17.5 degrees is a timing at which energization is switched from the W-phase stator coil to the U-phase stator coil, and the drawing illustrates immediately after the switching has been made. In a section of 60 degrees from the rotor rotation angle of −17.5 degrees to 42.5 degrees, end surfaces on the rotor side of the tooth parts U1 and U2 become N poles through a current flowing through the U-phase stator coil. In a first half of the section (up to 12.5 degrees), end surfaces on the rotor side of the tooth parts V1 and V2 become S poles through a current flowing through the V-phase stator coil. In a second half of the section (after 12.5 degrees), end surfaces on the rotor side of the tooth parts W1 and W2 become S poles through a current flowing through the W-phase stator coil.

In FIG. 10, the U-phase stator coil whose rotor side is an N pole exerts a repulsive force on the facing rotor magnet 6c whose stator side is an N pole, and thereby the rotor (the rotor cores 6b and the rotor magnets 6c) is rotate. Further, at the rotor rotation angle of −17.5 degrees, although the repulsive force through the U-phase stator coil acts to hinder rotation of the rotor, since a transient build-up current of the U-phase stator coil is small due to inductance of the U-phase stator coil, the repulsive force does not actually affect the rotation of the rotor. The V-phase stator coil whose rotor side is an S pole exerts a repulsive force on the facing rotor magnet 6c whose stator side is an S pole until just before 12.5 degrees in FIG. 10, and thereby the rotor is rotated. The W-phase stator coil whose rotor side is an S pole exerts a repulsive force on the facing rotor magnet 6c whose stator side is an S pole from 12.5 degrees until just before 42.5 degrees in FIG. 10, and thereby the rotor is rotated. Further, as in the repulsive force of the U-phase stator coil at the rotor rotation angle of −17.5 degrees, although the repulsive force through the W-phase stator coil acts to hinder rotation of the rotor at the rotor rotation angle of 12.5 degrees, since a transient build-up current of the W-phase stator coil is small due to inductance of the W-phase stator coil, the repulsive force does not actually affect the rotation of the rotor.

Although the section of 60 degrees from the rotor rotation angle of −17.5 degrees to 42.5 degrees has been described above, the same thing occurs for each 60 degrees thereafter while the phase is shifted by one.

Figure 11:
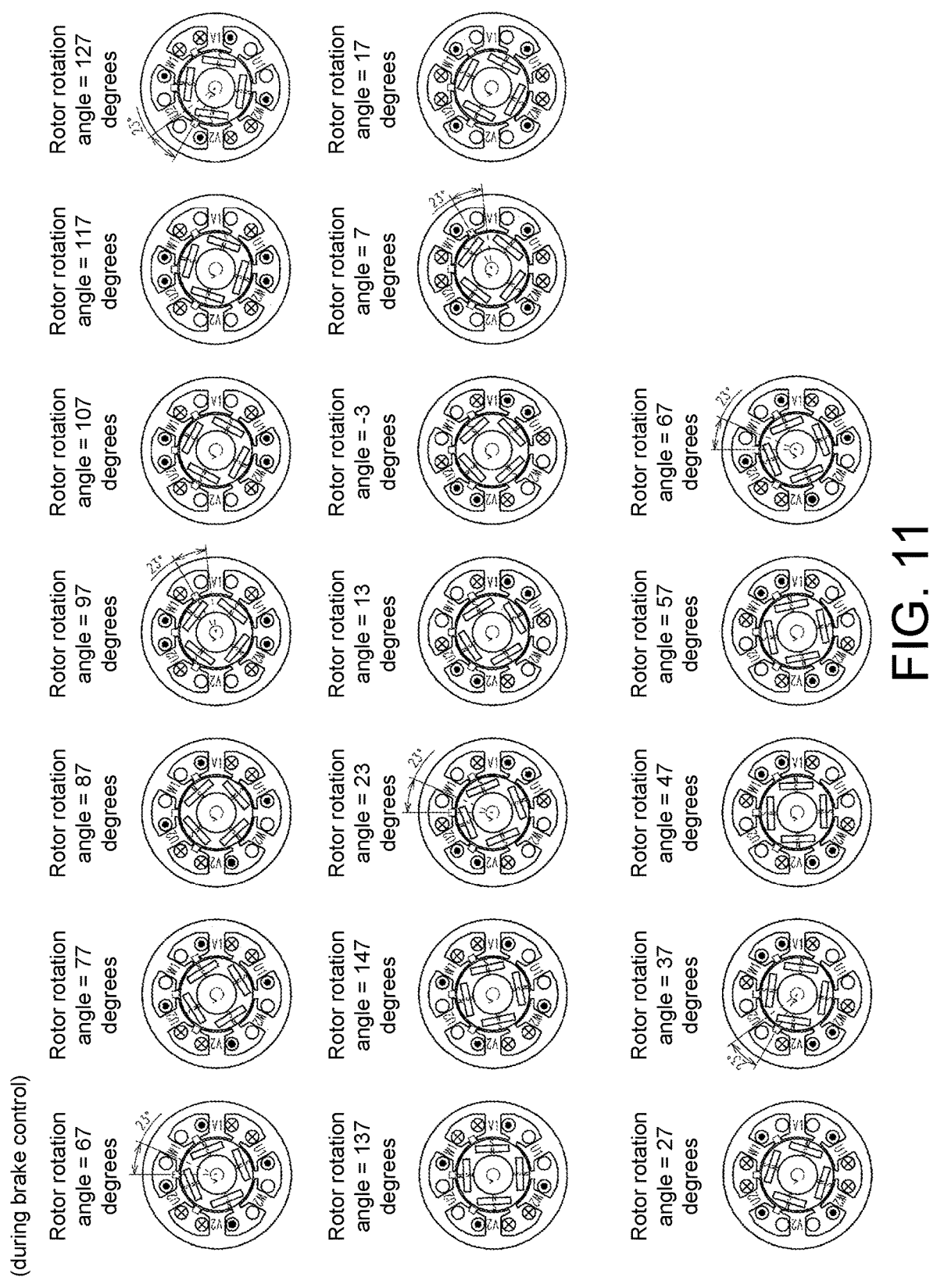

FIG. 11 illustrates cross-sectional views of the motor 6, which are explanatory views illustrating a relationship between change in rotor rotational position and a current flowing through the stator coils 6e in the brake control. A rotor rotation angle of 67 degrees is a timing at which energization is switched from the W-phase stator coil to the U-phase stator coil, and the drawing illustrates immediately after the switching has been made. In a section of 60 degrees from the rotor rotation angle of 67 degrees to 127 degrees, end surfaces on the rotor side of the tooth parts U1 and U2 become N poles through a current flowing through the U-phase stator coil through change in magnetic flux caused by rotation of the rotor. In a first half of the section (up to 97 degrees), end surfaces on the rotor side of the tooth parts V1 and V2 become S poles through a current flowing through the V-phase stator coil through change in magnetic flux caused by rotation of the rotor. In a second half of the section (after 97 degrees), end surfaces on the rotor side of the tooth parts W1 and W2 become S poles through a current flowing through the W-phase stator coil through change in magnetic flux caused by rotation of the rotor.

In the rotor rotation angle of 67 degrees to 97 degrees in FIG. 11, the U-phase stator coil whose rotor side is an N pole exerts an attracting force on the facing rotor magnet 6c whose stator side is an S pole, and generates a braking force that decelerates rotation of the rotor. Further, at the rotor rotation angle of 67 degrees, a current flowing through the U-phase stator coil flows in the same direction as when the motor is driven. Thus, in a section from the rotor rotation angle of 67 degrees to 127 degrees, since the attracting force exerted, by the U-phase stator coil whose rotor side is an N pole, on the facing rotor magnet 6c whose stator side is an S pole acts to reverse the rotor, a braking force is generated in the rotor 6r. After the 127 degrees, since the magnet whose stator side is an S pole becomes more distant from the U-phase stator coil, the use of the U-phase stator coil is stopped in the brake control.

The V-phase stator coil whose rotor side is an S pole exerts an attracting force on the facing rotor magnet 6c whose stator side is an N pole until just before 97 degrees in FIG. 11, and thereby a braking force that decelerates rotation of the rotor is generated. The W-phase stator coil whose rotor side is an S pole exerts an attracting force on the facing rotor magnet 6c whose stator side is an N pole from 97 degrees until just before 127 degrees in FIG. 11, and thereby a braking force that decelerates rotation of the rotor is generated.

Although the section of 60 degrees from the rotor rotation angle of 67 degrees to 127 degrees has been described above with reference to FIG. 11, the same thing occurs for each 60 degrees thereafter while the phase is shifted by one.

According to the present embodiment, the following effects can be achieved.

(1) The arithmetic unit 21 is configured to flow a current through the first diode bridge 15 in a brake control. Specifically, a switching control is performed while sequentially switching a combination of any one of the upper arm side switching elements Q1 to Q3 and any one of the lower arm side switching elements Q4 to Q6 so that a current is caused to flow in a closed loop (a closed loop in a same direction as that at the time of driving) that sequentially passes through any one of the upper arm side switching elements Q1 to Q3, the stator coil 6e, any one of the lower arm side switching elements Q4 to Q6, and the first diode bridge 15. Thereby, even when the closed loop is repeatedly opened and closed by a PWM control, a large voltage due to regenerative energy can be inhibited from being applied to the electrolytic capacitor C2. That is, since a brake can be applied while the current flowing at the time of a brake control flows in the same direction as when the motor is driven, the current at the time of the brake control can also flow to the first diode bridge 15 and can be inhibited from concentrating on the capacitor C2. Therefore, a brake having an appropriate strength can be applied while a risk of deterioration, breakage, or the like of elements on the circuit due to the regenerative energy is inhibited. With regards to this, in a case of the brake control in which the upper arm side switching elements Q1 to Q3 are turned off and the lower arm side switching elements Q4 to Q6 are PWM controlled, during the period in which the lower arm side switching elements Q4 to Q6 are turned off, regenerative energy trying to cause a current (a current in a reverse direction to that at the time of driving) to flow in the order of any of the lower arm side switching elements Q4 to Q6, the stator coil, and the upper arm side switching elements Q1 to Q3 is generated and the regenerative energy cannot be cut off (applied to the electrolytic capacitor C2 or the first diode bridge 15 via a parasitic diode of the switching elements Q1 to Q6) by the switching elements Q1 to Q6, thereby leading to deterioration or breakage of the electrolytic capacitor C2 or the like. Particularly, a capacity of the electrolytic capacitor C2 is suppressed to be as small as possible in order to give priority to miniaturization, and thereby the electrolytic capacitor C2 has a high possibility of deterioration or breakage. In the present embodiment, a brake having an appropriate strength can be applied while suitably avoiding a risk such as deterioration or breakage of the elements. Furthermore, according to the brake control in the present embodiment, since circuit elements such as a smoothing capacitor or the like can be made small, the power tool can be made small in size. The above-described effects are particularly remarkable in a power tool in which regenerative energy during braking tends to increase due to inertia of a tip tool such as a power tool in which work is performed by rotating a circular tip tool at high speed.

(2) The arithmetic unit 21 is configured to be able to change and adjust the mechanical lead angle in a brake control in comparison with the mechanical lead angle in a drive control of the motor 6. Therefore, an appropriate braking force can be obtained by adjusting the mechanical lead angle in accordance with specifications (specifications of a motor, a magnitude of output, or the like) of an object to which the disclosure is applied.

(3) Since the arithmetic unit 21 sets a duty ratio of a PWM control in the brake control according to a rotation speed of the motor 6 at the start of the brake control, an appropriate braking force according to the rotation speed of the motor 6 can be generated. Here, when the duty ratio is made to be smaller as the rotation speed of the motor 6 at the start of the brake control becomes lower, a braking force when the trigger 7 is momentarily pulled back and returned can be weakened, and this is convenient. Also, since the braking force can be weakened when a braking force cannot be weakened by adjusting a lead angle, an adjustable range of the braking force can be expanded.

(4) Since the first switch 11 is a two-pole switch, even when one side is fixed to ON by melting or the like, a current can be cut off through the other side. Therefore, even when a malfunction occurs in the second switch 12 or the arithmetic unit 21, unintended rotation of the motor 6 can be inhibited.

(5) Since the first switch 11 is provided on an input side of the first diode bridge 15, a current path including the first diode bridge 15 can be suitably configured in a brake control after the first switch 11 is turned off. In the present embodiment, since the inverter circuit 47 during braking is controlled in the same manner as when the motor is driven, in a case in which power is supplied from the AC power supply to the inverter circuit 47 at the time of a brake control, there is a likelihood that a control of driving the motor will be executed. However, as described above, in the present embodiment in which the first switch 11 which is a two-pole switch is provided on the input side of the first diode bridge 15, power supply to the inverter circuit 47 can be more suitably cut off. Particularly, in the present embodiment in which the first diode bridge 15 is controlled to be included in a closed path that is generated during braking, although an alternating electricity before being rectified by the first diode bridge 15 is input to the first switch 11 because the first switch 11 is provided on the input side of the first diode bridge 15, the alternating electricity including a positive component and a negative component can be more suitably cut off since the first switch 11 is a two-pole switch that cuts off current paths on a positive side and a negative side. Therefore, a brake control in which a risk such as deterioration, breakage, or the like of elements is inhibited can be more suitably realized. Further, when an alternating electricity from the power supply is input to the first diode bridge 15 during the brake control (in which the second switch is in an OFF state) due to some abnormality, there is a possibility that a rotational speed of the motor 6 will not decrease or will increase, but when this state is detected, the motor 6 is preferably stopped by other controls different from the brake control described above. The other controls may include, for example, a control of naturally reducing the rotational speed without performing the switching of the inverter circuit 47, or a control of turning on any of the lower arm side switching elements Q4 to Q6 at a duty ratio of 100% after the rotational speed is naturally reduced to a predetermined rotational speed such that inertia energy of the grindstone 8a becomes sufficiently small. According to these other controls, although the time until the motor 6 stops is longer compared to that in the brake control of the present embodiment, deterioration or breakage of circuit elements due to regenerative energy can be inhibited while a decrease in fixed force of the grindstone 8a is suppressed.

Figure 12:
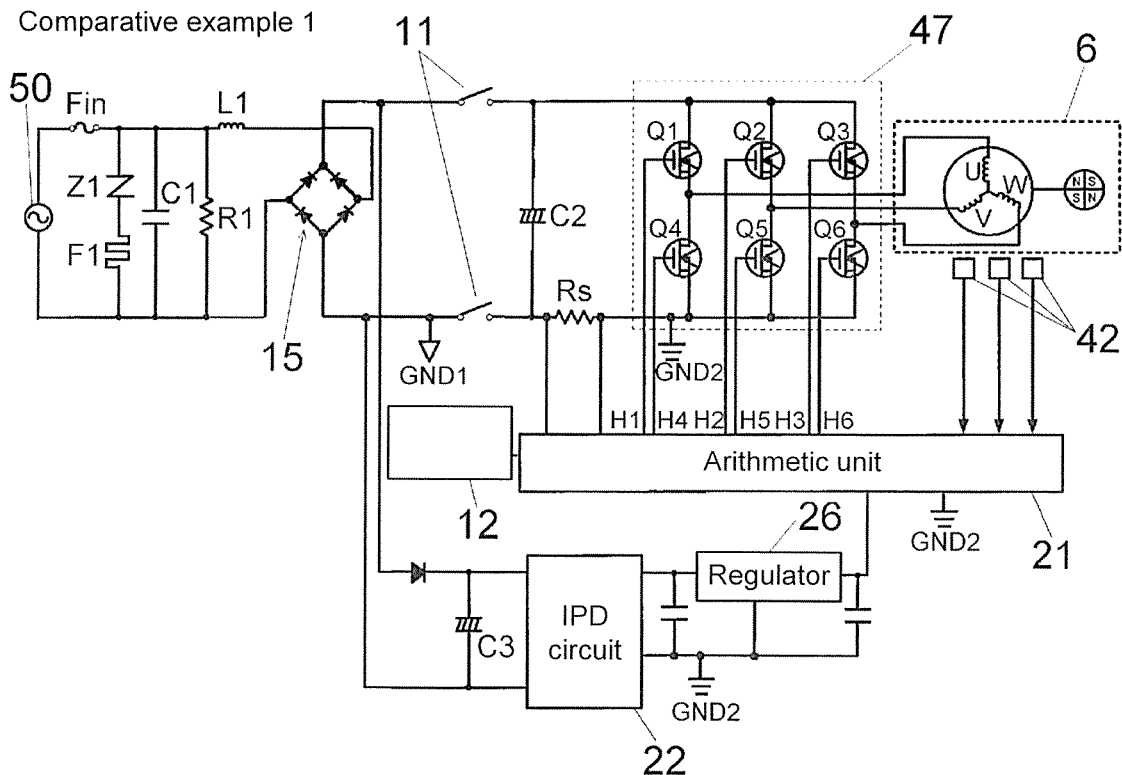
FIG. 12 is a circuit diagram of a power tool of Comparative example.
Figure 13:
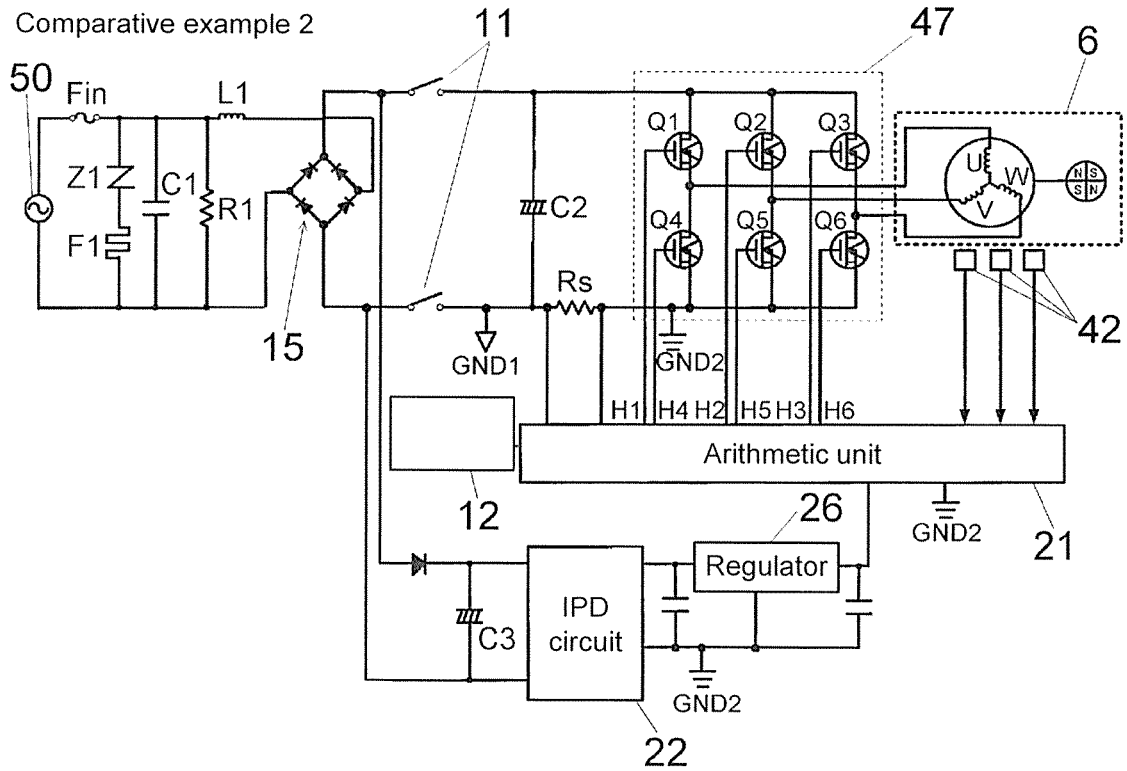
FIG. 13 is a circuit diagram of a power tool of Comparative example.

(6) Since the first switch 11 is provided on the input side of the first diode bridge 15, unlike a case in which the first switch 11 is provided on an output side of the first diode bridge 15 as in Comparative examples 1 and 2 illustrated in FIGS. 12 and 13, when the first switch 11 is turned off, the second ground GND2 is inhibited from floating with respect to the first ground GND1, or the first ground GND1 and the second ground GND2 are inhibited from floating together, and thereby loss of control or failure in control in the brake control can be inhibited. That is, in Comparative example 1 illustrated in FIG. 12, the second ground GND2 which is the ground of the arithmetic unit 21 floats from the first ground GND1, and, in Comparative example 2 illustrated in FIG. 13, both the first ground GND1 and the second ground GND2 are floated, but such a problem can be appropriately solved in the present embodiment.

(7) In comparative examples 1 and 2 illustrated in FIGS. 12 and 13, when one on an upper side (plus side) of the first switch 11 is turned on first, a high voltage is applied to the entire circuit, and then at the moment when the other on a lower side (ground side) thereof is turned on later, a potential difference is generated and causes a large current to flow, and thereby there is a likelihood of breakage in the elements, but in the present embodiment, since the first switch 11 is provided on the input side of the first diode bridge 15, such a problem can be appropriately solved.

(8) Since the first switch 11 is provided on the input side of the first diode bridge 15, even when the first diode bridge 15 is short-circuited due to a failure, a current can be cut off as long as the first switch 11 is OFF. Further, since the second diode bridge 16 is for a control system power supply and has a small current, an incidence of a short circuit due to a failure is much smaller compared to that of the first diode bridge 15.

While the present disclosure has been described above on the basis of the embodiment as an example, it is understood by those skilled in the art that various modifications can be made to each component and each processing process of the embodiment within the scope of the claims. Hereinafter, modified examples will be described.

The present disclosure can also be applied to other types of power tools other than a grinder, such as, for example, a circular saw. The specific numerical values of the mechanical lead angle and the duty ratio exemplified in the embodiment are merely examples and may be set as appropriate according to required specifications. The second switch 12 may be integrally provided inside the first switch 11.

What is claimed is:

1. A power tool comprising:
   a brushless motor;
   an inverter circuit which energizes the brushless motor;
   a control unit which controls the inverter circuit;
   a switch which switches between application and cutoff of a voltage input to the inverter circuit; and
   a rectifying circuit which converts alternating electricity into direct electricity and supplies the direct electricity to the inverter circuit, wherein
   the control unit performs a brake control of applying a braking force to the brushless motor when the switch is turned off, and
   the brake control is a control of causing a current to flow to the rectifying circuit.

2. The power tool according to claim 1, wherein
   the switch is a two-pole switch provided on an input side of the rectifying circuit and switches between conducting and cutting off of both of a path between an AC power supply and one input terminal of the rectifying circuit and a path between the AC power supply and the other input terminal of the rectifying circuit.

3. The power tool according to claim 1, wherein the inverter circuit includes an upper arm side switching element and a lower arm side switching element, and the control unit reduces a duty ratio of at least one of the upper arm side switching element and the lower arm side switching element in the brake control when a rotation speed of the brushless motor is reduced to a threshold value or lower.

4. The power tool according to claim 1, wherein the control unit makes a lead angle in the brake control larger than a lead angle in a drive control of the brushless motor.

5. The power tool according to claim 1, wherein the brake control causes a current to flow through the inverter circuit in the same direction as a current direction when the brushless motor is driven.

6. The power tool according to claim 1, comprising:
a rectifying circuit which rectifies an AC power supply; and
a smoothing capacitor which smoothes a current from the rectifying circuit, wherein
a current at a time of the brake control passes through the rectifying circuit.

7. The power tool according to claim 1, wherein the switch is a two-pole switch and switches between conducting and cutting off of both of two paths connected to the inverter circuit.

8. The power tool according to claim 7, comprising:
a first rectifying circuit which converts alternating electricity into direct electricity and supplies the direct electricity to the inverter circuit, wherein
the switch is provided on an input side of the first rectifying circuit and switches between conducting and cutting off of both of a path between an AC power supply and one input terminal of the first rectifying circuit and a path between the AC power supply and the other input terminal of the first rectifying circuit.

9. The power tool according to claim 8, comprising:
a control unit which controls the inverter circuit; and
a second rectifying circuit which supplies power to the control unit, wherein
the second rectifying circuit is connected to the AC power supply without passing through the switch.

10. A power tool comprising:
a brushless motor;
an inverter circuit which energizes the brushless motor;
a control unit which controls the inverter circuit; and
a switch which switches between application and cutoff of a voltage input to the inverter circuit, wherein
the inverter circuit includes an upper arm side switching element and a lower arm side switching element,
the control unit performs a brake control of applying a braking force to the brushless motor when the switch is turned off, and
the brake control is a control of causing a current to flow in order through the upper arm side switching element, the brushless motor, and the lower arm side switching element.

11. The power tool according to claim 10, comprising:
a rectifying circuit which converts alternating electricity into direct electricity and supplies the direct electricity to the inverter circuit, wherein
the switch is a two-pole switch provided on an input side of the rectifying circuit and switches between conducting and cutting off of both of a path between an AC power supply and one input terminal of the rectifying circuit and a path between the AC power supply and the other input terminal of the rectifying circuit.

12. The power tool according to claim 10, wherein the control unit reduces a duty ratio of at least one of the upper arm side switching element and the lower arm side switching element in the brake control when a rotation speed of the brushless motor is reduced to a threshold value or lower.

13. The power tool according to claim 10, wherein the control unit makes a lead angle in the brake control larger than a lead angle in a drive control of the brushless motor.

14. The power tool according to claim 10, wherein the brake control causes a current to flow through the inverter circuit in the same direction as a current direction when the brushless motor is driven.

15. The power tool according to claim 10, comprising:
a rectifying circuit which rectifies an AC power supply; and
a smoothing capacitor which smoothes a current from the rectifying circuit, wherein
a current at a time of the brake control passes through the rectifying circuit.

* * * * *